(12) United States Patent
Wu

(10) Patent No.: US 10,142,617 B2
(45) Date of Patent: Nov. 27, 2018

(54) ARRAY SUBSTRATE AND DISPLAY DEVICE FOR IMPLEMENTING 2D/3D DISPLAY SWITCH AND METHOD FOR DRIVING DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 183 days.

(21) Appl. No.: 14/417,031

(22) PCT Filed: Jun. 13, 2014

(86) PCT No.: PCT/CN2014/079844
§ 371 (c)(1),
(2) Date: Jan. 23, 2015

(87) PCT Pub. No.: WO2015/100951
PCT Pub. Date: Jul. 9, 2015

(65) Prior Publication Data
US 2015/0381971 A1    Dec. 31, 2015

(30) Foreign Application Priority Data

Dec. 31, 2013   (CN) .......................... 2013 1 0752464

(51) Int. Cl.
*H04N 13/00*   (2018.01)
*H04N 13/317*  (2018.01)
(Continued)

(52) U.S. Cl.
CPC ....... *H04N 13/317* (2018.05); *G02B 27/2214* (2013.01); *G09G 3/003* (2013.01);
(Continued)

(58) Field of Classification Search
CPC .......... G02B 27/2214; H04N 13/0415; G09G 3/003; G09G 2300/0443; G02F 2001/134345
See application file for complete search history.

(56) References Cited

U.S. PATENT DOCUMENTS

2007/0058113 A1*  3/2007  Wu ........................ G02B 5/201
                                                349/106
2008/0278639 A1* 11/2008  Hamagishi ......... G02B 27/2214
                                                349/8
(Continued)

FOREIGN PATENT DOCUMENTS

CN          101510413 A      8/2009
CN          102510513 A      6/2012
(Continued)

OTHER PUBLICATIONS

Written Opinion of the International Searching Authority for international application No. PCT/CN2014/079844.

*Primary Examiner* — Christopher E Leiby
(74) *Attorney, Agent, or Firm* — Harness, Dickey & Pierce, P.L.C.

(57) ABSTRACT

The present disclosure provides an array substrate for implementing 2D/3D display switch. The array substrate includes M*N pixel units arranged in an array form, and M and N are positive integers. Each pixel unit includes at least a first pixel subunit A and a second pixel subunit B, the M*N pixel units include at least 2M*N pixel subunits. During the 2D display, the first pixel subunit A and the second pixel subunit B of the pixel unit in an $m^{th}$ row display identical image information, m is a positive integer less than or equal to M. During the 3D display, the first pixel subunit A of the pixel unit in the $m^{th}$ row and the second pixel subunit B of the (Continued)

pixel unit in an $(m-1)^{th}$ row display identical image information, and m is an integer greater than 1 and less than or equal to M.

13 Claims, 10 Drawing Sheets

(51) Int. Cl.
    *G02B 27/22*      (2018.01)
    *G09G 3/00*       (2006.01)
    *G02F 1/1343*   (2006.01)
(52) U.S. Cl.
    CPC ............ *G02F 2001/134345* (2013.01); *G09G 2300/0443* (2013.01)

(56) References Cited

U.S. PATENT DOCUMENTS

| | | | | |
|---|---|---|---|---|
| 2009/0141122 | A1* | 6/2009 | Hong | G02B 27/2214 348/54 |
| 2010/0118045 | A1* | 5/2010 | Brown Elliott | G02B 27/2214 345/589 |
| 2011/0157169 | A1* | 6/2011 | Bennett | G06F 3/14 345/419 |
| 2013/0038811 | A1* | 2/2013 | Sugita | G02B 27/22 349/61 |
| 2013/0135293 | A1 | 5/2013 | Kim et al. | |
| 2013/0176299 | A1* | 7/2013 | Hamagishi | G06T 15/00 345/419 |
| 2014/0002509 | A1* | 1/2014 | Kim | G09G 3/003 345/690 |
| 2014/0036047 | A1* | 2/2014 | Watanabe | G02B 27/2214 348/54 |
| 2014/0085439 | A1* | 3/2014 | Niwano | G02B 27/2214 348/56 |
| 2014/0313298 | A1* | 10/2014 | Usukura | G03B 35/24 348/59 |

FOREIGN PATENT DOCUMENTS

| | | |
|---|---|---|
| CN | 102866509 A | 1/2013 |
| CN | 102881245 A | 1/2013 |
| CN | 103472587 A | 12/2013 |
| CN | 103676302 A | 3/2014 |
| JP | H09-96777 A | 4/1997 |
| JP | 2008197423 A | 8/2008 |
| KR | 20060032547 A | 4/2006 |

\* cited by examiner

ARRAY SUBSTRATE AND DISPLAY DEVICE FOR IMPLEMENTING 2D/3D DISPLAY SWITCH AND METHOD FOR DRIVING DISPLAY DEVICE

CROSS-REFERENCE TO RELATED APPLICATION APPLICATIONS

The present application is the U.S. national phase of PCT Application No. PCT/CN2014/079844 filed on Jun. 13, 2014, which claims a priority of the Chinese patent application No. 201310752464.3 filed on Dec. 31, 2013, the disclosures of which are incorporated in their entirety by reference herein.

TECHNICAL FIELD

The present disclosure relates to the field of display technology, in particular to an array substrate and a display device for implementing 2D/3D display switch, and a method for driving the display device.

BACKGROUND

Currently, the display technology has progressed from 2D display to 3D display. In order to meet various requirements of users, a 2D/3D display switch technique, which enables the display of an image in a 2D or 3D mode according to the users' requirements, has become a new trend for a stereo display device.

Parallax baffle 3D display is the most common 3D display technique at present, and FIG. 1 shows its structure and principle, where an array substrate 1 and a parallax baffle 2 are provided. The parallax baffle 2 is arranged in front of or behind the array substrate 1, and consists of nonopaque regions 21 and parallax barriers 22 arranged at a regular interval. Different images are viewed through the parallax barrier 2 by left and right eyes of a viewer, so the 3D image display is achieved.

Based on the above-mentioned 3D display principle, an active barrier is usually used in the prior art so as to implement the 2D/3D display switch. As shown in FIG. 2, the active barrier 3, as a liquid crystal panel with a twisted nematic (TN) mode, is arranged in front of a display unit and includes an upper substrate 31, a lower substrate 32, a first electrode 33, a second electrode 34 and a liquid crystal layer 35 arranged between the first electrode 33 and the second electrode 34. When the first electrode 33 is electrically connected to the second electrode 34, a slit grating structure, in which the nonopaque regions and the parallax barriers are arranged at a regular interval, is formed, so as to achieve the 3D display. When the first electrode 33 is not electrically connected to the second electrode 34, the light can be transmitted so as to achieve the 2D display.

However, the active barrier with the structure as shown in FIG. 2 is very expensive, and has thus become a major obstacle to marketing the display device with a 2D/3D display switch function.

SUMMARY

An object of the present disclosure is to provide an array substrate and a display device for implementing 2D/3D display switch, and a method for driving the display device, so as to simplify the structure of the display device and facilitate the implementation of the structure, thereby to reduce the production cost.

In one aspect, the present disclosure provides an array substrate for implementing 2D/3D display switch, including M*N pixel units arranged in an array form, M and N being positive integers. Each pixel unit includes at least a first pixel subunit A and a second pixel subunit B, and the M*N pixel units include at least 2M*N pixel subunits. During the 2D display, the first pixel subunit A and the second pixel subunit B of the pixel unit in an $m^{th}$ row display identical image information, m is a positive integer less than or equal to M. During the 3D display, the first pixel subunit A of the pixel unit in the $m^{th}$ row and the second pixel subunit B of the pixel unit in an $(m-1)^{th}$ row display identical image information, and m is an integer greater than 1 and less than or equal to M.

Alternatively, in each pixel unit, the first pixel subunit A and the second pixel subunit B are of an identical shape, size, and color to be displayed. Alternatively, the shape, size and color to be displayed of the first pixel subunit A and the second pixel subunit B are determined in accordance with a design requirement of the array substrate.

In another aspect, the present disclosure provides a display device for implementing 2D/3D display switch, including an array substrate including M*N pixel units arranged in an array form, M and N being positive integers, each pixel unit including at least a first pixel subunit A and a second pixel subunit B, the M*N pixel units including at least 2M*N pixel subunits, during the 2D display, the first pixel subunit A and the second pixel subunit B of the pixel unit in an $m^{th}$ row displaying identical image information, m being a positive integer less than or equal to M, during the 3D display, the first pixel subunit A of the pixel unit in the $m^{th}$ row and the second pixel subunit B of the pixel unit in an $(m-1)^{th}$ row displaying identical image information, and m being an integer greater than 1 and less than or equal to M; and a parallax baffle arranged opposite to the array substrate and including a plurality of opaque parallax barriers, a nonopaque region being formed between two adjacent parallax barriers, the parallax barriers in adjacent rows being arranged in a staggered manner, the parallax barrier corresponding to a portion of the first pixel subunit A of the pixel unit in an $x^{th}$ row and a $(y-1)^{th}$ column and a portion of the second pixel subunit B of the pixel unit in an $(x-1)^{th}$ row and a $(y-1)^{th}$ column, x and y being each an integer greater than 1 and less than or equal to M.

Alternatively, the parallax barrier also corresponds to a portion of the first pixel subunit A of the pixel unit in the $x^{th}$ row and a $y^{th}$ column and a portion of the second pixel subunit B of the pixel unit in the $(x-1)^{th}$ row and the $y^{th}$ column.

Alternatively, the parallax barrier has a height equal to a sum of heights of the first pixel subunit A and the second pixel subunit B.

Alternatively, the parallax barrier in each row is offset by a predetermined offset amount relative to a corresponding parallax barrier in an adjacent row.

Alternatively, the parallax barrier and the corresponding parallax barrier in the adjacent row are two parallax barriers with a minimum distance from each other in the adjacent two rows along a horizontal direction of the rows.

Alternatively, the predetermined offset amount is half a width of a grating unit, and the width of the grating unit is equal to a sum of widths of the parallax barrier and the nonopaque region.

Alternatively, when the display device has S viewpoints, the pixel unit includes S pixel subunits, the predetermined offset amount is greater than or equal to a width of one pixel subunit and less than widths of S pixel subunits, and S is a positive integer.

Alternatively, the parallax barrier is arranged at a light-exiting side or a light-entering side of the array substrate.

In yet another aspect, the present disclosure provides a method for driving a display device, the display device including M*N pixel units arranged in an array form, M and N being positive integers, each pixel unit including at least a first pixel subunit A and a second pixel subunit B, the M*N pixel units including at least 2M*N pixel subunits. The method includes:

inputting image information with a resolution of M*N so as to enable the first pixel subunit A and the second pixel subunit B of the pixel unit in an $m^{th}$ row to display identical image information, thereby to achieve 2D image display, m being a positive integer less than or equal to M; and inputting left-eye image information with a resolution of M*(N/2) and right-eye image information with a resolution of M*(N/2), so as to enable the first pixel subunit A of the pixel unit in the $m^{th}$ row and the second pixel subunit B of the pixel unit in an $(m-1)^{th}$ row to display identical image information and enable the first pixel subunit A and the second pixel subunit B of the pixel unit in the $m^{th}$ row to receive different image information, thereby to achieve 3D image display, m being a positive integer greater than 1 and less than or equal to M.

The present disclosure at least has the following advantageous effects. According to the present disclosure, an existing array substrate is improved by dividing one pixel unit into at least two portions, and the parallax baffle with its gratings arranged in a staggered manner, i.e., a fixed grating, is used in conjunction with the array substrate, so as to switch between a 2D display mode and a 3D display mode. In addition, the resolution will not be reduced during the 2D display. As compared with an existing structure where an active barrier is used to implement the 2D/3D display switch, the structure of the present disclosure is simple and easy to be implemented, and the product cost can thus be reduced.

DETAILED DESCRIPTION

In order to make the objects, the technical solutions and the advantages of the present disclosure more apparent, the present disclosure will be described hereinafter in conjunction with the drawings and the embodiments.

According to an array substrate and a display device for implementing 2D/3D display switch of the present disclosure, an existing array substrate is improved by dividing each pixel unit into two subpixels, and a fixed grating is used in conjunction with this structure, so as to switch between a 2D display mode and a 3D display mode. As a result, it is able to simplify the structure of the display device and facilitate the implementation of the structure of the display device, thereby to reduce the production cost.

Figure 1:
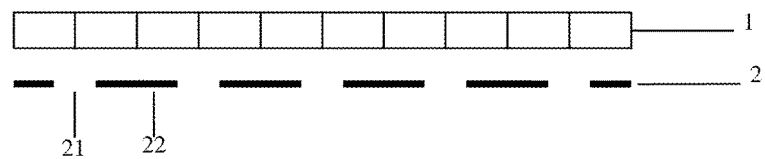
FIG. 1 is a schematic view showing the principle for implementing 3D display in the related art.
Figure 2:
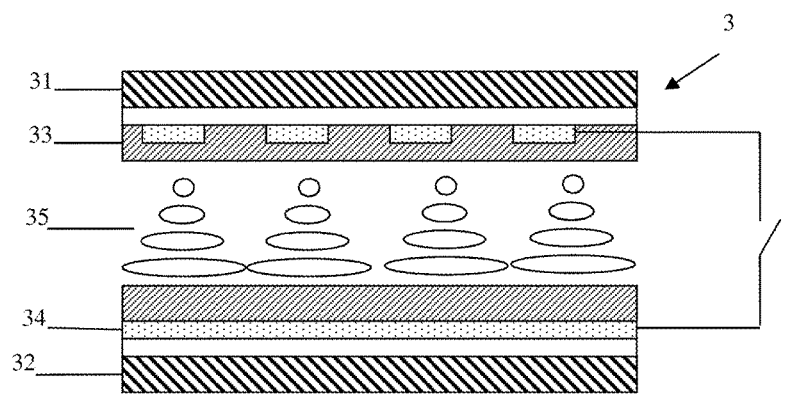
FIG. 2 is a schematic view showing an existing structure for implementing 2D/3D display switch using an active barrier.
Figure 3:
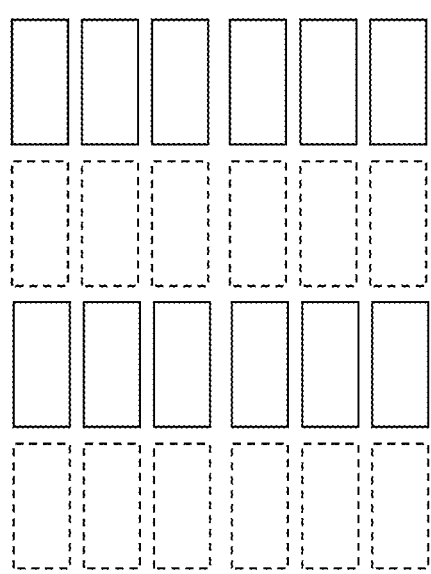
FIG. 3 is a schematic view showing the arrangement of pixel units on an existing display panel.
Figure 4:
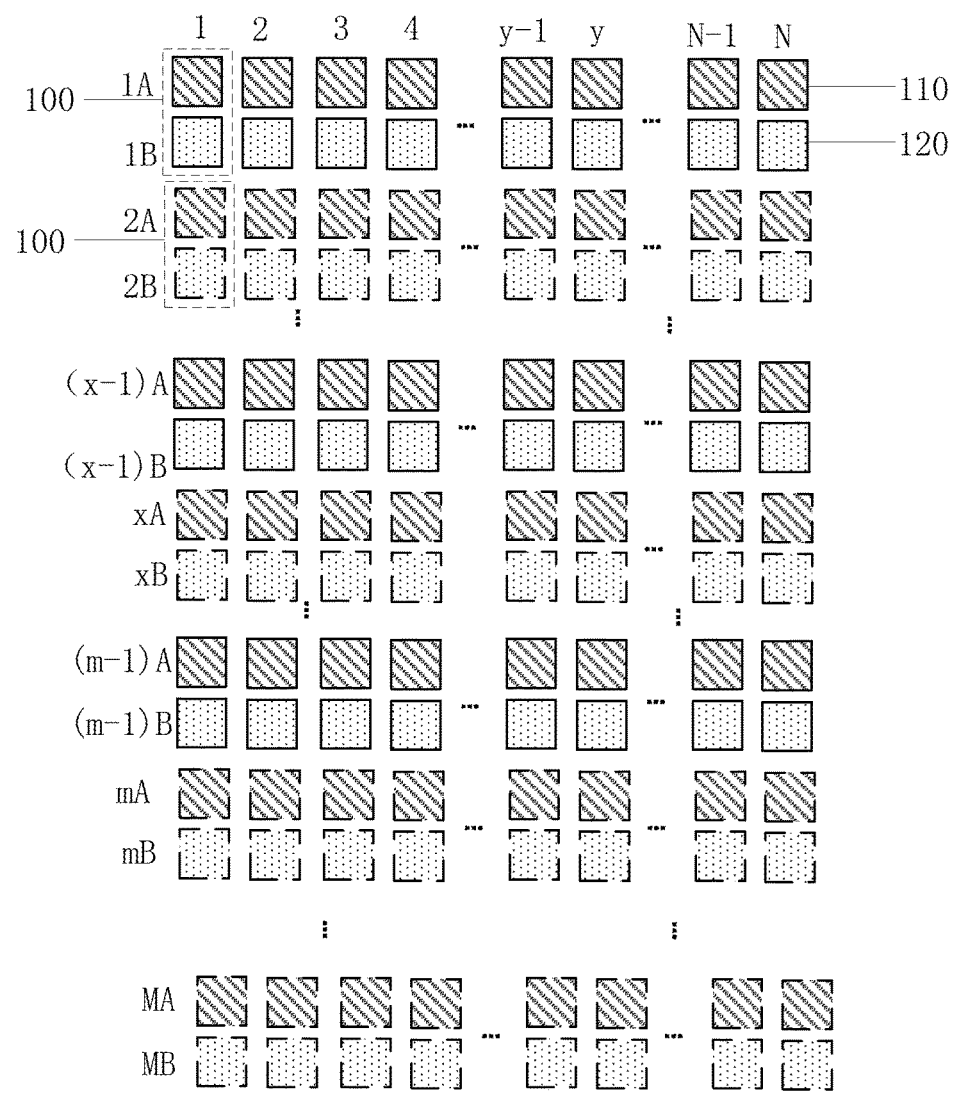
FIG. 4 is a schematic view showing the arrangement of pixel units on a display panel for implementing the 2D/3D display switch according to one embodiment of the present disclosure.

FIG. 3 is a schematic view showing the arrangement of pixel units on an existing array substrate, and FIG. 4 is a schematic view showing the arrangement of pixel units on the array substrate according to one embodiment of the present disclosure.

As shown in FIG. 4, xA and xB represent a first pixel subunit A 110 and a second pixel subunit B 120 included in the pixel unit in an $x^{th}$ row, respectively, and (x−1) A and (x−1) B represent the first pixel subunit A 110 and the second pixel subunit B 120 included in the pixel unit in an $(x-1)^{th}$ row, each subunit is a subpixel. Hence, a pixel arrange array of a display panel includes the pixel subunits in rows 1A, 1B, 2A, 2B, . . . , (x−1) A, (x−1) B, xA, xB, . . . , MA and MB, wherein M and N are positive integers, and x is a positive integer greater than 1 and less than or equal to M.

By comparing FIG. 3 with FIG. 4, it can be seen that the array substrate for implementing the 2D/3D display switch in the present disclosure also includes a plurality of pixel units 100 arranged in an array form. However, different from the prior art, each pixel unit 100 of the array substrate in the present disclosure includes the first pixel subunit A 110 and the second pixel subunit B 120 separated from each other, and the first pixel subunit A 110 and the second pixel subunit B 120 are located in an identical column but in two adjacent rows, respectively.

Hence, as compared with the prior art where a display panel includes M*N pixel units and has a resolution of M*N, in the present disclosure, a display panel including at least 2M*N pixel subunits and having a resolution of at least 2M*N will be obtained.

In addition, in the present disclosure, the first pixel subunit A 110 and the second pixel subunit B 120 included in each pixel unit 100 are controlled independently of each other. Shapes, sizes and colors of the first pixel subunit A 110 and the second pixel subunit B 120 may be identical to, or different from, each other, and may be determined in accordance with a design requirement of the array substrate. Alternatively, the first pixel subunit A 110 and the second pixel subunit B 120 are of an identical shape, size and color, so as to simplify the structure of the array substrate and facilitate the manufacture thereof.

The pixel units 100 of the array substrate are arranged with the structure as mentioned above. When the array substrate is used in conjunction with a fixed, step-like parallax baffle, during the 2D display, the first pixel subunit A 110 and the second pixel subunit B 120 of the pixel unit 100 in the $m^{th}$ row display identical image information, wherein m is a positive integer less than or equal to M; and during the 3D display, the first pixel subunit A 110 of the pixel unit 100 in the $m^{th}$ row and the second pixel subunit B 120 of the pixel unit in an $(m-1)^{th}$ row display the identical image information, wherein m is a positive integer greater than 1 and less than or equal to M. In other words, during the 2D display, the first pixel subunit A 110 and the second pixel subunit B 120 belonging to the same pixel unit 100 display the identical image information, while during the 3D display, the first pixel subunit A 110 and the second pixel subunit B 120 belonging to the same pixel unit 100 display different image information. For example, during the 3D display, the first pixel subunit A 110 of the pixel unit 100 in the $m^{th}$ row and the second pixel subunit B 120 of the pixel unit 100 in the $(m-1)^{th}$ row display the identical image information. In this way, it is able to achieve both the 2D image display and the 3D image display, and to view an image in a full resolution manner during the 2D image display.

The principle for implementing the 2D image display and the 3D image display will be described hereinafter when the array substrate of the present disclosure is used in conjunction with the fixed, step-like parallax baffle.

Figure 5:
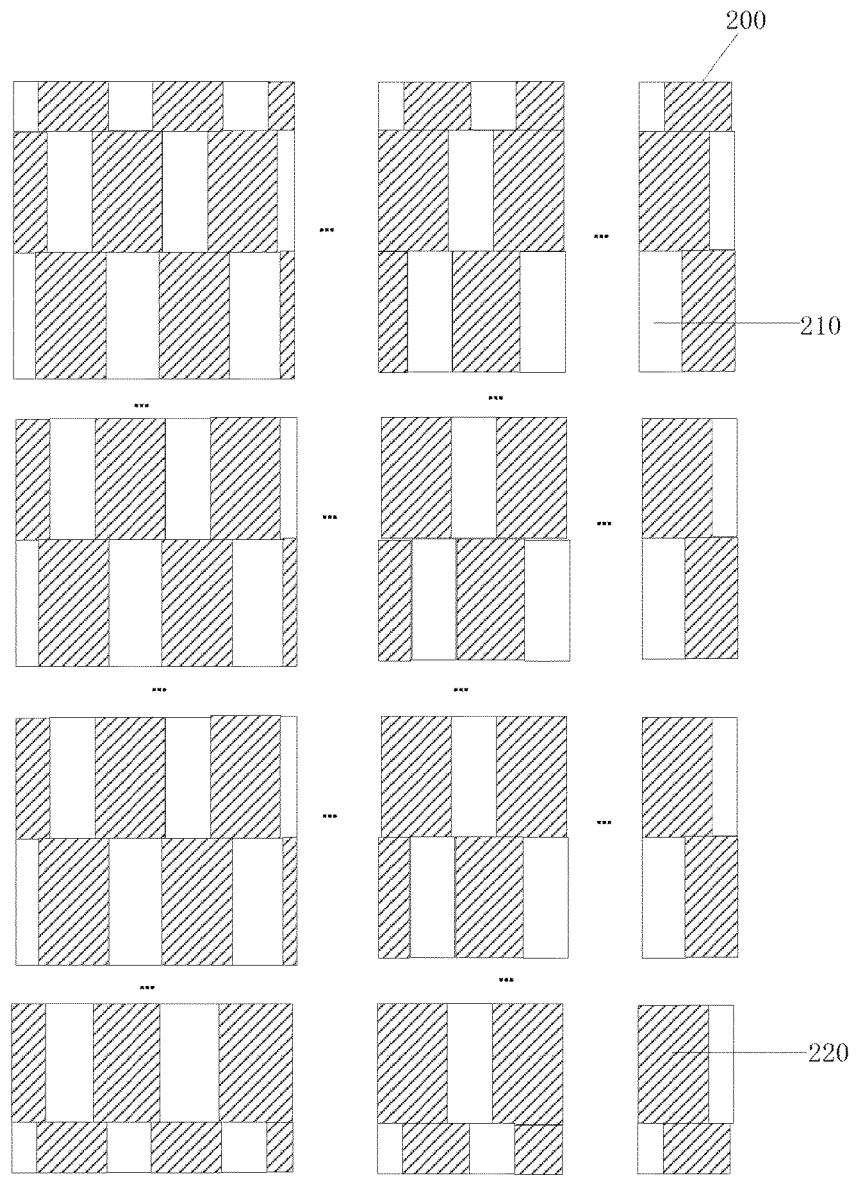
FIG. 5 is a schematic view showing a partial structure of a parallax baffle according to one embodiment of the present disclosure.
Figure 6:
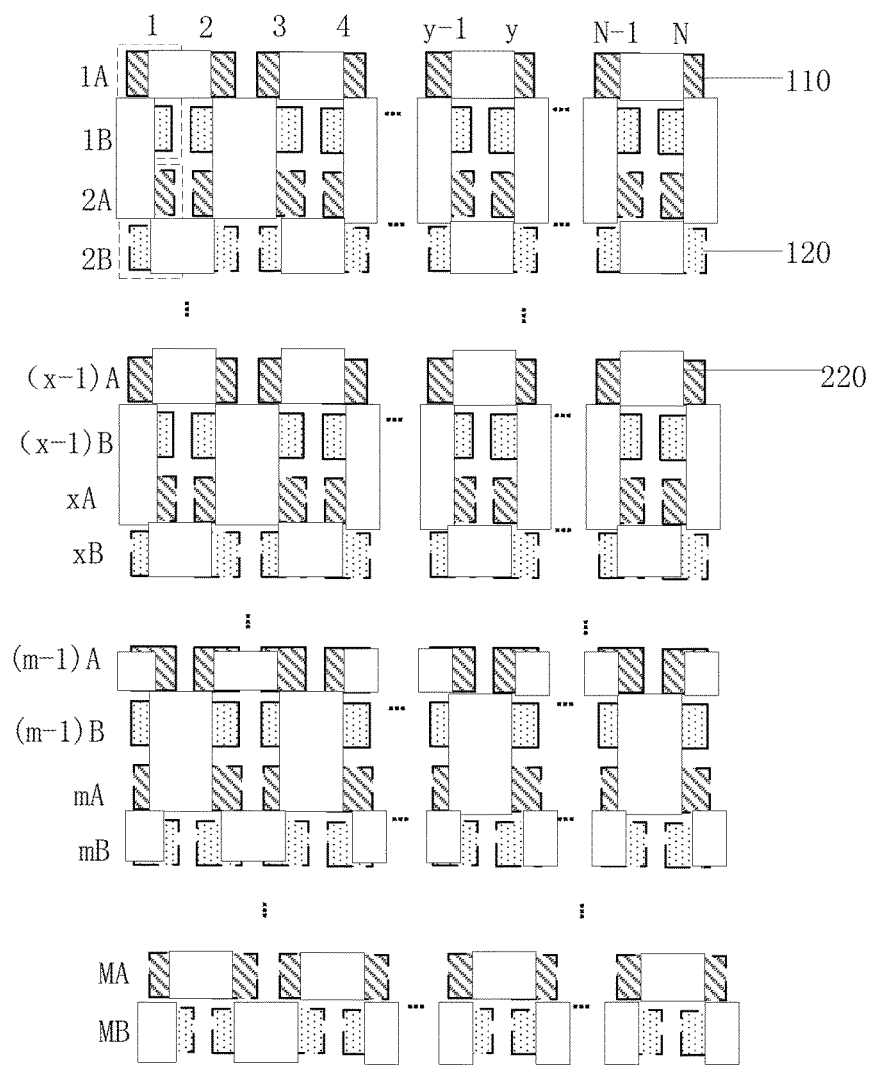
FIG. 6 is a schematic view showing a partial structure of a combination of the parallax baffle and the pixel units in FIG. 4 according to one embodiment of the present disclosure.

FIG. 5 is a schematic view showing a partial structure of the parallax baffle according to one embodiment of the present disclosure, and FIG. 6 is a schematic view showing a partial structure of a combination of the parallax baffle and the pixel units arranged in a manner as shown in FIG. 4.

Referring to FIGS. 5 and 6, in a display device including the array substrate as shown in FIG. 4, the parallax baffle 200 is used in conjunction with the display panel, so as to implement the 2D/3D display switch. The parallax baffle 200 includes a plurality of opaque parallax barriers 220, and a nonopaque region 210 is formed between two adjacent parallax barriers 220. The parallax barriers 220 and the nonopaque regions 210 are arranged in adjacent rows in a staggered manner, e.g., the parallax barrier 220 in each row is offset by a predetermined offset amount relative to a corresponding parallax barrier 220 in an adjacent row, rather than in a column identical thereto. Similarly, the nonopaque region 210 in each row is also offset by the predetermined offset amount relative to a corresponding nonopaque region 210 in the adjacent row, rather than in a column identical thereto.

The parallax barrier and the corresponding parallax barrier in the adjacent row refer to, as shown in FIGS. 5 and 6, two parallax barriers with a minimum distance from each other in the adjacent two rows along a first horizontal direction of the rows. Similarly, the nonopaque region and the corresponding nonopaque region in the adjacent row refer to two nonopaque regions with a minimum distance from each other in the adjacent two rows along the first horizontal direction of the rows.

As shown in FIG. 6, in this embodiment, the parallax baffle 200 is arranged opposite to the array substrate and at a light-exiting or light-entering side of the array substrate. At least portions of the first pixel subunit A 110 and the second pixel subunit B 120 included in the pixel unit 110 of the array substrate are exposed through the nonopaque regions 210, respectively.

Based on the above, the parallax barrier 220 of the parallax baffle 200 shields at least portions of the adjacent first pixel subunit A 110 and second pixel subunit B 120 in an identical column, and the shielded first pixel subunit A 110 and second pixel subunit B 120 belong to different pixel units 100. Meanwhile, when the parallax barrier 220 shields at least portions of the adjacent first pixel subunit A 110 and second pixel subunit B 120 in a $(y-1)^{th}$ column, it will also shield at least portions of the adjacent first pixel subunit A 110 and second pixel subunit B 120 in a $y^{th}$ column, and the shielded first pixel subunit A 110 and second pixel subunit B 120 in the $y^{th}$ column belong to different pixel units 100.

For example, as shown in FIG. 6, the parallax barrier 220 corresponds to a portion of the first pixel subunit A 110 of the pixel unit in an $x^{th}$ row and a $(y-1)^{th}$ column and a portion of the second pixel subunit B 120 of the pixel unit in an $(x-1)^{th}$ row and the $(y-1)^{th}$ column, wherein x and y are positive integers greater than 1 and less than or equal to M. In addition, the parallax barrier 220 further corresponds to a portion of the first pixel subunit A 110 of the pixel unit in the $x^{th}$ row and a $y^{th}$ column and a portion of the second pixel subunit B 120 of the pixel unit in the $(x-1)^{th}$ row and the $y^{th}$ column.

Referring again to FIG. 6, by taking parts of the pixel units as an example, when the parallax baffle 200 is adopted, the pixel subunits (x-1)B and XA are set as a group and correspond to a group of gratings, i.e., a group of nonopaque regions 210 and parallax barriers 220. The parallax barrier 220 shields portions of the pixel subunits (x-1)B and the pixel subunits xA which are located in the $(y-1)^{th}$ column but do not belong the same pixel unit. As also shown in FIG. 6, the parallax barrier 220 further shields portions of the pixel subunits (x-1)B and the pixel subunits xA which are located in the $y^{th}$ column but do not belong to the same pixel unit.

In addition, in the present disclosure, the parallax barrier 220 has a height equal to a sum of heights of the first pixel subunit A 110 and the second pixel subunit B 120. The parallax barriers 220 in the adjacent rows are arranged in a staggered manner on the parallax baffle 200, and the parallax barrier 220 in each row is offset by an offset amount P relative to the corresponding parallax barrier in the adjacent row. Similarly, the nonopaque region 210 in each row is also offset by the offset amount P relative to the corresponding nonopaque region in the adjacent row. In this embodiment, the offset amount P is half a width of a grating unit, and the width of the grating unit is equal to a sum of widths of the parallax barrier 220 and the nonopaque region 210. Illustratively, as shown in FIGS. 5 and 6, the parallax barriers 220 in odd rows are arranged in a column, and the parallax barriers 220 in even rows are arranged in a column. Similarly, the nonopaque regions 210 in odd rows are arranged in a column, and the nonopaque regions 210 in even rows are arranged in a column.

When the 3D display device has two viewpoints, one pixel unit includes two pixel subunits, and the offset amount P may be set as identical to a width of the pixel subunit.

Figure 7:
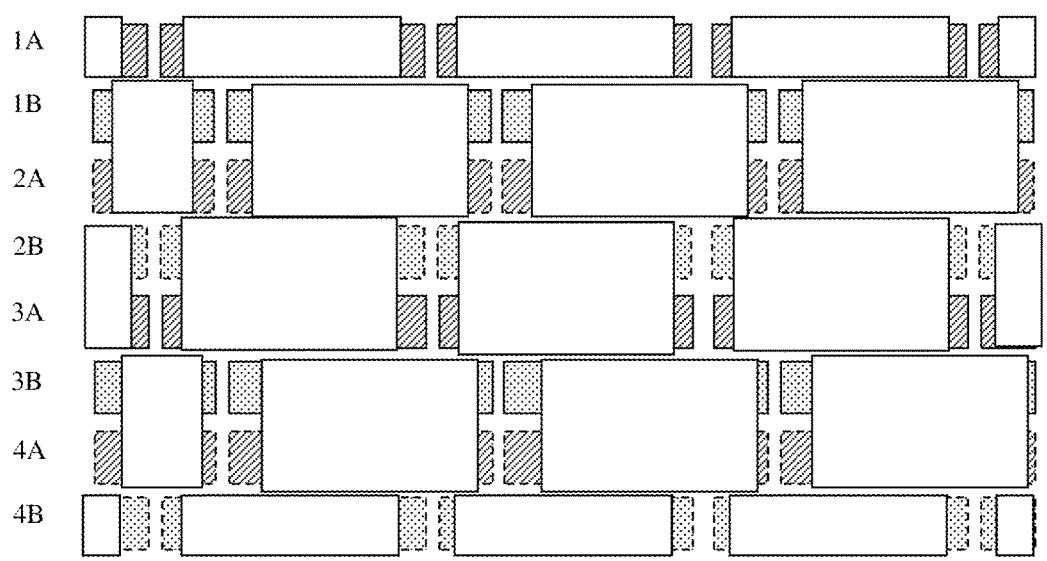
FIG. 7 is a schematic view showing a partial structure of the combination of the parallax baffle and the pixel units in FIG. 4 according to another embodiment of the present disclosure.

As shown in FIG. 7, when the 3D display device has 5 viewpoints, one pixel unit may include 5 pixel subunits. The parallax barriers in the adjacent rows are arranged in a staggered manner on the parallax baffle, and the parallax barrier in each row is offset by the offset amount P relative to the corresponding parallax barrier in the adjacent row. Similarly, the nonopaque region in each row is also offset by the offset amount P relative to the corresponding nonopaque region in the adjacent row. In this embodiment, the offset amount P may be set as greater than or equal to a width of one pixel subunit and less than five widths of five pixel subunits.

In other words, when the 3D display device has multiple viewpoints, e.g., S viewpoints, one pixel unit may include S pixel subunits, and the offset amount P may be set as greater than or equal to a width of one pixel subunit and less than widths of S pixel subunits, wherein S is a positive integer. Alternatively, the offset amount P may be an integral multiple of the width of one pixel subunit. By using the above-mentioned arrangement mode, it is able to enhance the resolution during the 3D display.

In addition, widths of the parallax barrier 220 and the nonopaque region 210 on the parallax baffle and the relationship therebetween are designed in a manner so as to meet the requirements of the 3D image display. This part belongs to a well-known technique in the art, and will not be particularly defined herein.

Based on the combination of the array substrate and the parallax baffle 200 with the mentioned structures, the present disclosure further provides a display device capable of implementing 2D/3D display switch. Referring to FIG. 6, the display device includes:

the array substrate including a plurality of pixel units 100 arranged in an array form, each pixel unit including the first pixel subunit A 110 and the second pixel subunit B 120 separated from each other, the first pixel subunit A 110 and the second pixel subunit B 120 being located in an identical column and in two adjacent rows, respectively; and the parallax baffle 200 arranged opposite to the display panel and at the light-exiting or light-entering side of the array substrate, the parallax baffle 200 including a plurality of nonopaque regions 210 and parallax barriers 220 arranged in a staggered manner, and at least portions of the first pixel subunit A 110 and the second pixel subunit B 120 being exposed through the nonopaque region 210, respectively.

The principle of the display device capable of implementing both 2D image display and 3D image display will be described hereinafter.

During the 2D image display, the 2D image information with a resolution of M*N is inputted so as to enable the first pixel subunit A 110 and the second pixel subunit B 120 of the pixel unit 100 in the $m^{th}$ row to display the identical image information, thereby to achieve the 2D image display, wherein m is a positive integer less than or equal to M. In other words, gate electrodes corresponding to the first pixel subunit A 110 and the second pixel subunit B 120 in an identical row are turned on simultaneously, so as to enable the first pixel subunit A 110 and the second pixel subunit B 120 of the pixel unit 100 in the identical row to display the same contents. When the image is viewed by a viewer through the parallax baffle 200, an image region viewed by his left eye is shown in FIG. 8, and an image region viewed by his right eye is shown in FIG. 9.

Figure 8:
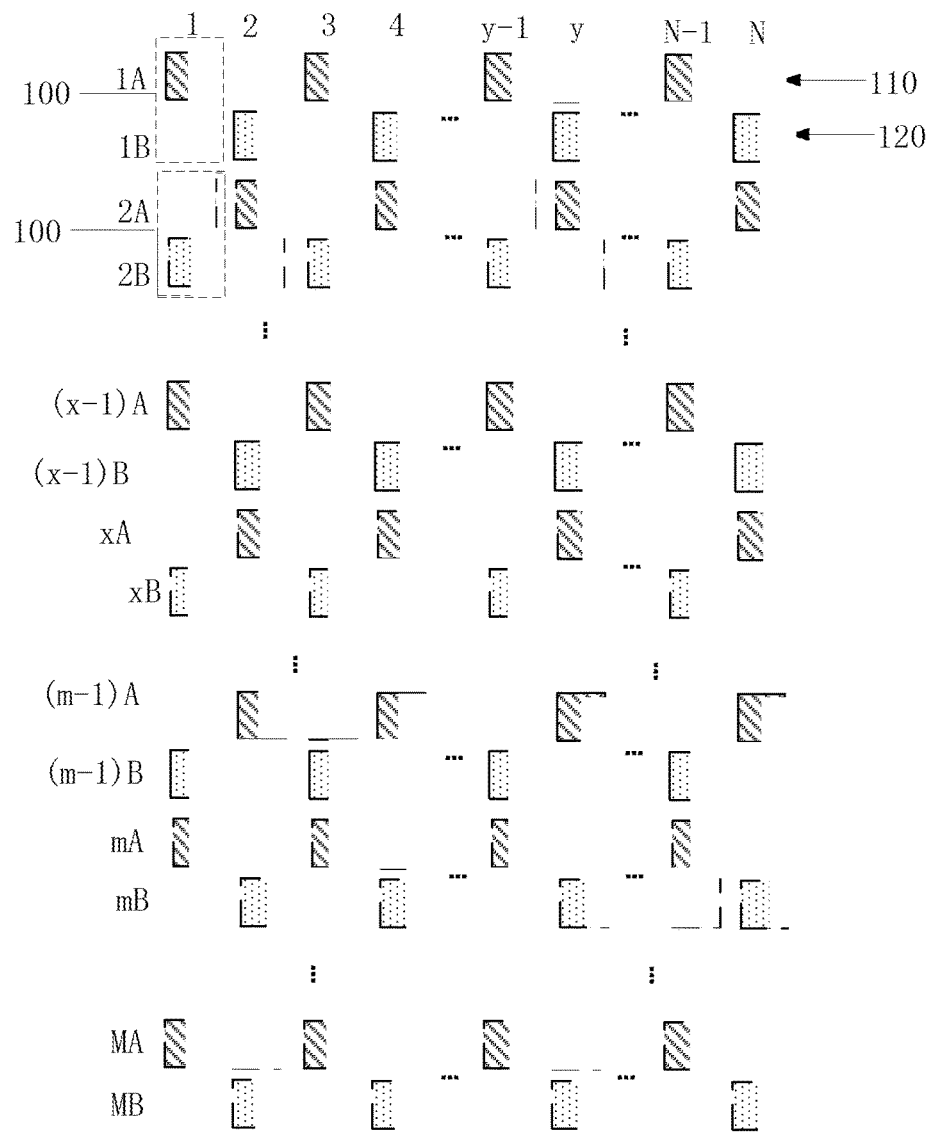
FIG. 8 is a view showing a partial image region that can be viewed by a left eye during the 2D image display.
Figure 9:
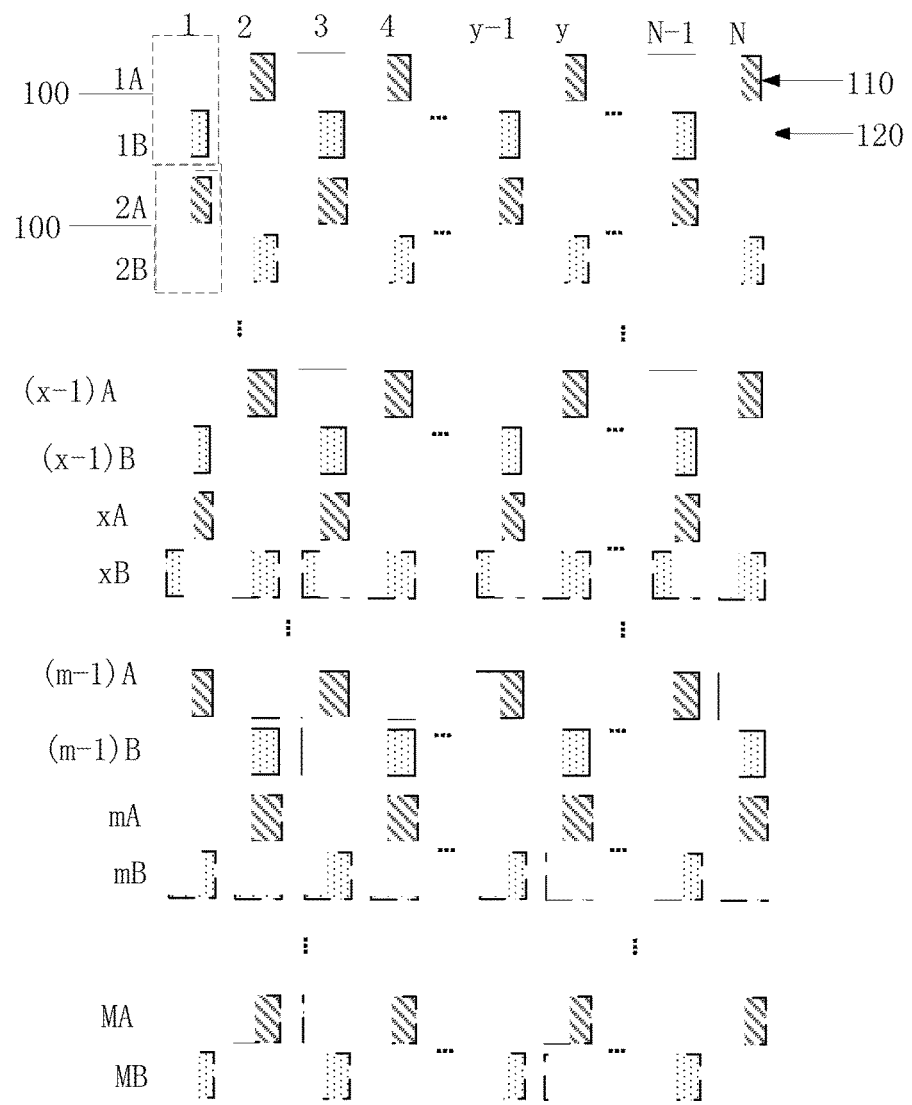
FIG. 9 is a view showing a partial image region that can be viewed by a right eye during the 2D image display.

Referring to FIGS. 8 and 9, for the image with a resolution of M*N, the image information can be viewed by both the left and right eyes during the 2D image display, but a lower right corner or an upper right corner of the pixel unit can merely be viewed by the right eye and an upper left corner or a lower left corner of the pixel unit can be merely viewed by the left eye. Hence, different image information are viewed by the left and right eyes, respectively, and the entire image information are viewed by the viewer. In addition, the images with a resolution of M*N can be viewed by both the left and right eyes, so the resolution will not be reduced during the 2D image display.

During the 3D image display, left-eye image information with a resolution of M*(N/2) and right-eye image information with a resolution of M*(N/2) are inputted in accordance with the arrangement mode, so as to enable the first pixel subunit A 110 of the pixel unit 100 in the $m^{th}$ row and the second pixel subunit B 120 of the pixel unit in the $(m-1)^{th}$ row to display identical image information, and enable the first pixel subunit A 110 and the second pixel subunit B 120 of the pixel unit 100 in the $m^{th}$ row to receive different image information, thereby to implement the 3D image display, wherein m is a positive integer greater than and less than or equal to M. When an image is viewed by the viewer through the parallax baffle, an image region viewed by the left eye is shown in FIG. 10, and an image region viewed by the right eye is shown in FIG. 11.

Figure 10:
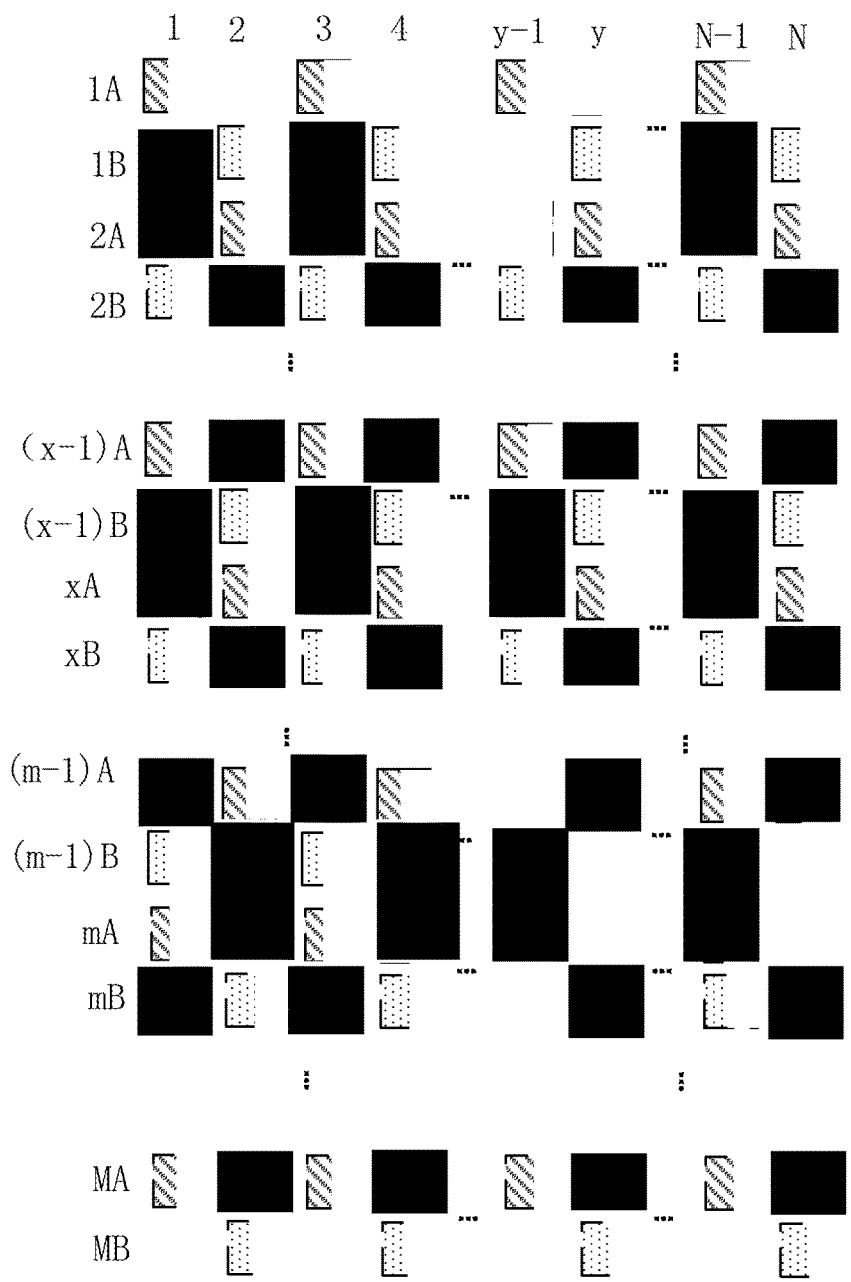
FIG. 10 is a view showing a partial image region that can be viewed by the left eye during the 3D image display.
Figure 11:
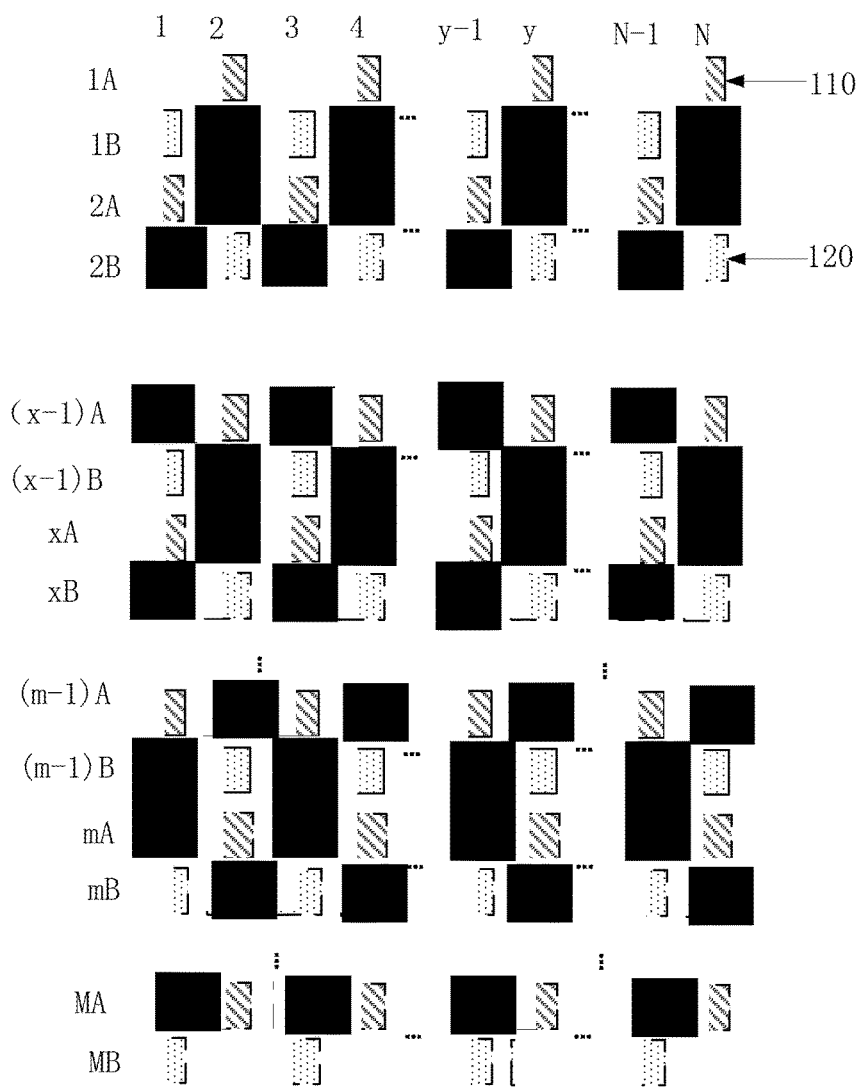
FIG. 11 is a view showing a partial image region that can be viewed by the right eye during the 3D image display.

Referring to FIGS. 10 and 11, for the image with a resolution of M*N, the image with a resolution of M*(N/2) can be viewed by the left and right eyes during the 3D image display, and this image is the same as that for autostereoscopic 3D display.

According to the 3D display device of the present disclosure, the improved array substrate is used in conjunction with the parallax baffle with the above-mentioned structure, i.e., the fixed grating, so as to implement the 2D/3D display switch. In addition, the resolution will not be reduced during the 2D display. As compared with an existing structure where an active barrier is used to implement the 2D/3D display switch, the structure of the present disclosure is simple and easy to be implemented, and the product cost can thus be reduced.

The 3D display device of the present disclosure may be a liquid crystal display device. It should be appreciated that, the parallax baffle may be arranged at the light-exiting side or the light-entering side of the array substrate. Of course, the display device may also be an organic light-emitting diode (OLED) display device, and at this time, the parallax baffle is arranged at the light-exiting side of the array substrate.

The present disclosure further provides a method for driving the above-mentioned display device. The display device includes M*N pixel units arranged in an array form, each pixel unit includes the first pixel subunit A and the second pixel subunit B, the M*N pixel units includes at least 2M*N pixel subunits, and M and N are both positive integers. The method includes:

inputting image information with a resolution of M*N so as to enable the first pixel subunit A and the second pixel subunit B of the pixel unit in the $m^{th}$ row to display identical image information, thereby to achieve 2D image display, m being a positive integer less than or equal to M; and inputting left-eye image information with a resolution of M*(N/2) and right-eye image information with a resolution of M*(N/2), so as to enable the first pixel subunit A of the pixel unit in the $m^{th}$ row and the second pixel subunit B of the pixel unit in an $(m-1)^{th}$ row to display identical image information and enable the first pixel subunit A and the second pixel subunit B of the pixel unit in the $m^{th}$ row to receive different image information, thereby to achieve 3D image display, m being a positive integer greater than 1 and less than or equal to M.

By using the above-mentioned method, when a 2D control signal is inputted, the 2D image display will be achieved, and when a 3D control signal is inputted, the 3D image display will be achieved. As a result, it is able to switch between a 2D display mode and a 3D display mode.

The above are merely the preferred embodiments of the present disclosure. It should be noted that, a person skilled in the art may make further improvements and modifications without departing from the principle of the present disclosure, and these improvements and modifications shall also fall within the scope of the present disclosure.

What is claimed is:

1. A display device for implementing a two dimension (2D)/three dimension (3D) display switch, the display device comprising:

an array substrate including M*N pixel units arranged in an array, where M and N are positive integers, wherein:
each of the M*N pixel units consists of a first pixel subunit A and a second pixel subunit B which are independently controlled, where the M*N pixel units include 2M*N pixel subunits and each first pixel subunit A and second pixel subunit B is a subpixel,
during display of a 2D image, the first pixel subunit A and the second pixel subunit B of one of the M*N pixel units in a mth row of the array display identical image information, and m is a positive integer less than or equal to M,
during display of a 3D image, the first pixel subunit A of the one of the M*N pixel units in the mth row of the array and the second pixel subunit B of one of the M*N pixel units in a (m−1)th row of the array display identical image information, and m is an integer greater than 1 and less than or equal to M, and
each of the M*N pixel units includes only two subpixels; and
a parallax baffle arranged opposite to the array substrate and including a plurality of opaque parallax barriers, wherein:
a non-opaque region is formed between two adjacent ones of the plurality of opaque parallax barriers,
the plurality of opaque parallax barriers in adjacent rows are arranged in a staggered manner,
the plurality of opaque parallax barriers are arranged above a portion of the first pixel subunit A of the M*N pixel units in a xth row and a (y−1)th column of the array and a portion of the second pixel subunit B of the M*N pixel units in a (x−1)th row and a (y−1) th column of the array,
x and y are each an integer greater than 1 and less than or equal to M,
each of the plurality of opaque parallax barriers in each row of the array is offset by a predetermined offset amount relative to a corresponding one of the plurality of opaque parallax barriers in an adjacent row of the array, and
the predetermined offset amount is equal to or greater than a width of two pixel subunits.

2. The display device according to claim 1, wherein:
in each of the M*N pixel units, the first pixel subunit A and the second pixel subunit B are of an identical shape and size; and
the first pixel subunit A and the second pixel subunit B of each of the M*N pixel units are aligned in a column direction.

3. The display device according to claim 1, wherein each of the plurality of subpixels is a red subpixel, a green subpixel, or a blue subpixel.

4. The display device according to claim 1, wherein the plurality of opaque parallax barriers are arranged above a portion of the first pixel subunit A of the one of the M*N pixel units in the $x^{th}$ row and a $y^{th}$ column of the array and a portion of the second pixel subunit B of the one of the M*N pixel units in the $(x-1)^{th}$ row and the $y^{th}$ column of the array.

5. The display device according to claim 4, wherein each the plurality of opaque parallax barriers has a height equal to a sum of a height of one of the first pixel subunits A and a height of one of the second pixel subunits B.

6. The display device according to claim 1, wherein each the plurality of opaque parallax barriers has a height equal to a sum of a height of one of the first pixel subunits A and a height of one of the second pixel subunits B.

7. The display device according to claim 1, wherein each of the plurality of opaque parallax barriers and the corresponding one of the plurality of opaque parallax barriers in an adjacent row of the array are two parallax barriers with a minimum distance from each other in the corresponding adjacent two rows along a horizontal direction of the corresponding adjacent two rows.

8. The display device according to claim 1, wherein:
the predetermined offset amount is half a width of a grating unit; and
the width of the grating unit is equal to a sum of a width of one of the plurality of opaque parallax barriers and a width of the non-opaque region.

9. The display device according to claim 1, wherein when the display device has S viewpoints, the predetermined offset amount is greater than or equal to a width of one of the pixel subunits A and the pixel subunits B and less than widths of S of the pixel subunits A and the pixel subunits B, and where S is a positive integer.

10. The display device according to claim 1, wherein the plurality of opaque parallax barriers are arranged at a light-exiting side or a light-entering side of the array substrate.

11. A method for driving a display device, wherein the display device includes an array substrate and a parallax baffle, wherein the array substrate includes M*N pixel units arranged in an array, where M and N being positive integers, wherein each of the M*N pixel units consists of a first pixel subunit A and a second pixel subunit B which are independently controlled, where the M*N pixel units include 2M*N pixel subunits, wherein each first pixel subunit A and second pixel subunit B is a subpixel, wherein each of the M*N pixel units includes only two subpixels, wherein the parallax baffle is arranged opposite to the array substrate and comprises a plurality of parallax barriers, wherein a non-opaque region is formed between two adjacent ones of the plurality of parallax barriers, wherein the plurality of parallax barriers in adjacent rows are arranged in a staggered manner, wherein the plurality of parallax barriers are arranged above a portion of one of the first pixel subunits A of the M*N pixel units in a xth row and a (y−1)th column of the array and a portion of one of the second pixel subunits B of the M*N pixel units in an (x−1)th row and a (y−1)th column of the array, and where x and y are each an integer greater than 1 and less than or equal to M, the method comprising:
during a two-dimensional (2D) display, displaying identical image information via the first pixel subunit A and the second pixel subunit B of one of the M*N pixel units in a mth row of the array, and m is a positive integer less than or equal to M;
during a three-dimensional (3D) display, displaying identical image information via the first pixel subunit A of one of the M*N pixel units in the mth row and the second pixel subunit B of the one of the M*N pixel units in a (m−1)th row, and m is an integer greater than 1 and less than or equal to M;
inputting image information with a resolution of M*N to enable the first pixel subunit A and the second pixel subunit B of the one of the M*N pixel units in the mth row to display identical image information, thereby to achieve a 2D image display, where m is a positive integer less than or equal to M; and
inputting left-eye image information with a resolution of M*(N/2) and right-eye image information with a resolution of M*(N/2) to enable the first pixel subunit A of the one of the M*N pixel units in the mth row and the second pixel subunit B of the one of the M*N pixel units in an (m−1)th row to display identical image information and enable the first pixel subunit A and the second pixel subunit B of the pixel unit in the mth row to receive different image information, thereby to achieve a 3D image display, where m is a positive integer greater than 1 and less than or equal to M, wherein:
the first pixel subunit A and the second pixel subunit B in each of the M*N pixel units emit a same color of light,
each of the plurality of opaque parallax barriers in each row is offset by a predetermined offset amount relative to a corresponding one of the plurality of opaque parallax barriers in an adjacent row, and
the predetermined offset is equal to or greater than a width of two pixel subunits.

12. The method according to claim 11, wherein one of the plurality of parallax barriers has a height equal to a sum of a height of one of the first pixel subunits A and a height of one of the second pixel subunits B.

13. The method according to claim 11, wherein the plurality of parallax barriers are arranged at a light-exiting side or a light-entering side of the array substrate.

* * * * *